US010997997B1

(12) United States Patent
Xiong

(10) Patent No.: US 10,997,997 B1
(45) Date of Patent: May 4, 2021

(54) DATA STORAGE DEVICE COMPENSATING FOR MODE HOP OF A LASER

(71) Applicant: Western Digital Technologies, Inc., San Jose, CA (US)

(72) Inventor: Shaomin Xiong, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/877,765

(22) Filed: May 19, 2020

(51) Int. Cl.
*G11B 33/14* (2006.01)
*G11B 7/125* (2012.01)
*G11B 7/1263* (2012.01)
*G11B 7/1267* (2012.01)
*G11B 7/0045* (2006.01)
*G11B 5/455* (2006.01)

(52) U.S. Cl.
CPC ............ *G11B 7/1263* (2013.01); *G11B 5/455* (2013.01); *G11B 7/00456* (2013.01); *G11B 7/1267* (2013.01); *G11B 7/00458* (2013.01)

(58) Field of Classification Search
CPC ............ G11B 13/08; G11B 2005/0021; G11B 11/1051; G11B 11/105; G11B 5/00; G11B 5/6088; G11B 11/10511; G11B 7/1263; G11B 7/1267; G11B 7/1387; G11B 11/00; G11B 11/10534; G11B 7/126; G11B 5/012; G11B 5/02; G11B 5/40; G11B 5/4555
USPC ...................... 360/59, 75, 328, 97.12, 97.19; 369/13.33, 13.34, 116, 120
See application file for complete search history.

(56) References Cited

U.S. PATENT DOCUMENTS

| | | | |
|---|---|---|---|
| 7,639,575 B2 * | 12/2009 | Suzuki | G11B 7/126 369/116 |
| 8,934,188 B1 * | 1/2015 | Kim | G11B 5/012 360/55 |
| 9,275,663 B2 * | 3/2016 | Hur | G11B 5/455 |
| 9,583,135 B1 * | 2/2017 | Ma | G11B 20/1816 |
| 9,595,288 B1 | 3/2017 | Chu et al. | |
| 9,620,163 B1 | 4/2017 | Zheng et al. | |
| 9,747,928 B1 | 8/2017 | Ruan et al. | |
| 9,881,641 B1 | 1/2018 | Canchi et al. | |

* cited by examiner

*Primary Examiner* — Nabil Z Hindi

(57) ABSTRACT

A data storage device is disclosed comprising a head actuated over a recording medium, wherein the head comprises a laser configured to heat the recording medium. A mode hop map is generated for a write power applied to the laser during a write operation. The write power is applied to the laser during the write operation and the write power is adjusted in response to the mode hop map.

18 Claims, 9 Drawing Sheets

| MODE HOP MAP | TEMPERATURE 1 | TEMPERATURE 2 | TEMPERATURE 3 |
|---|---|---|---|
| LASER WRITE POWER 1 | MODE HOP MAP 1 | MODE HOP MAP 2 | MODE HOP MAP 3 |
| LASER WRITE POWER 2 | MODE HOP MAP 4 | MODE HOP MAP 5 | MODE HOP MAP 6 |
| LASER WRITE POWER 3 | MODE HOP MAP 7 | MODE HOP MAP 8 | MODE HOP MAP 9 |

FIG. 8

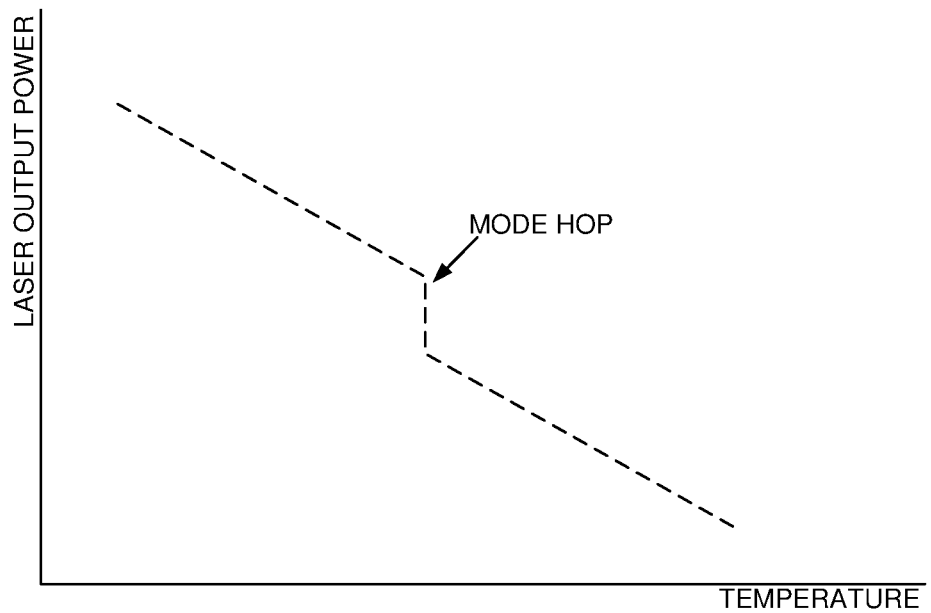

FIG. 9A

| LASER OUTPUT POWER | TEMPERATURE 1 | TEMPERATURE 2 | TEMPERATURE 3 |
|---|---|---|---|
| LASER WRITE POWER 1 | LASER OUTPUT POWER 1 | LASER OUTPUT POWER 2 | LASER OUTPUT POWER 3 |
| LASER WRITE POWER 2 | LASER OUTPUT POWER 4 | LASER OUTPUT POWER 5 | LASER OUTPUT POWER 6 |
| LASER WRITE POWER 3 | LASER OUTPUT POWER 7 | LASER OUTPUT POWER 8 | LASER OUTPUT POWER 9 |

FIG. 9B

DATA STORAGE DEVICE COMPENSATING FOR MODE HOP OF A LASER

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Since the quality of the write/read signal depends on the fly height of the head, conventional heads may also comprise an actuator for controlling the fly height. Any suitable fly height actuator (FHA) may be employed, such as a heater which controls fly height through thermal expansion, or a piezoelectric (PZT) actuator that actuates through mechanical deflection.

BRIEF DESCRIPTION OF THE DRAWINGS

FIG. 8 shows an embodiment wherein a mode hop map is generated for a plurality of different operating temperatures of the data storage device.

FIGS. 9A and 9B show an embodiment wherein multiple mode hops of the laser are detected over a plurality of different write powers and a plurality of different operating temperatures.

DETAILED DESCRIPTION

Figure 1:
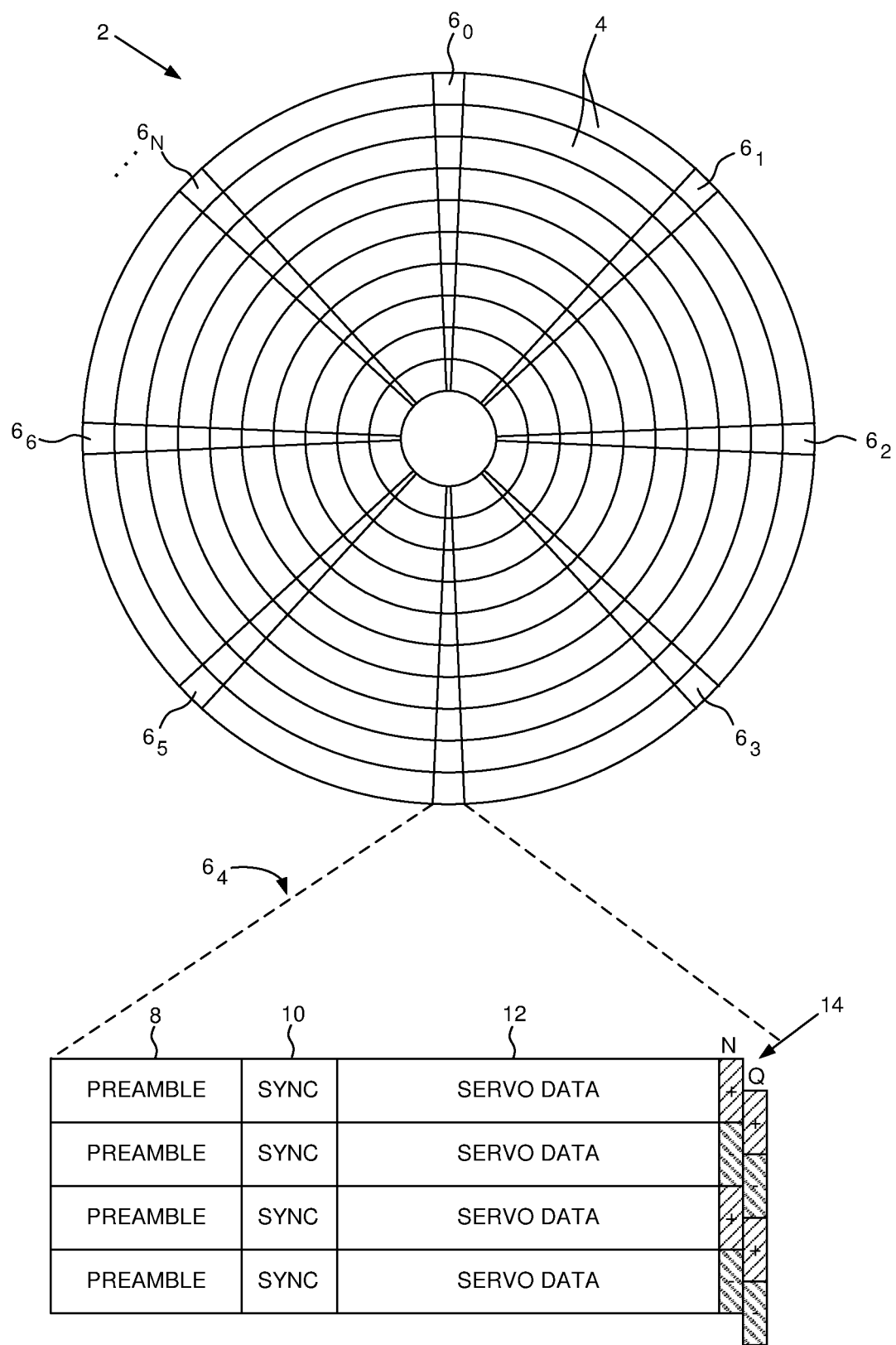
FIG. 1 shows a prior art disk format comprising a plurality of servo tracks defined by servo sectors.
Figure 2A:
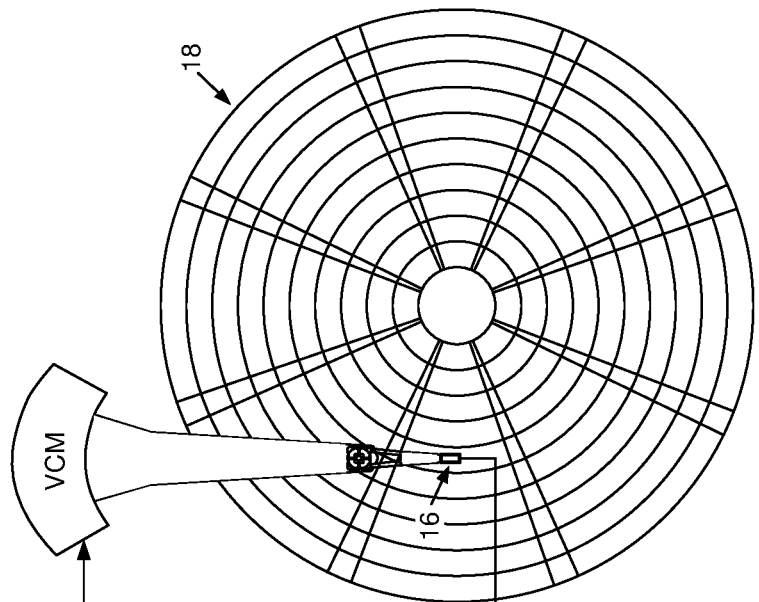
FIGS. 2A and 2B show a data storage device in the form of a disk drive according to an embodiment comprising a head actuated over a disk, wherein the head comprises a laser (LS) and a fly height actuator (FHA).
Figure 2B:
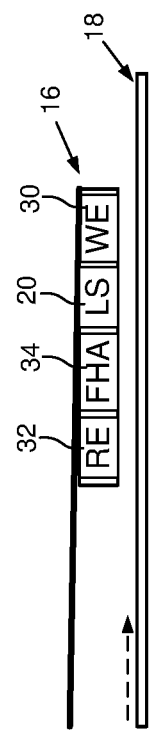
Figure 2C:
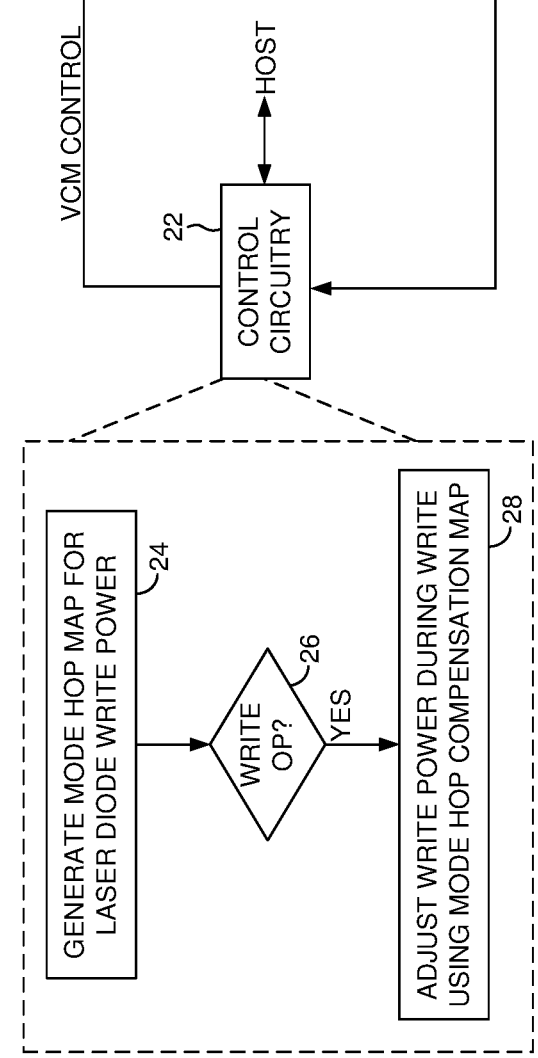
FIG. 2C is a flow diagram according to an embodiment wherein a mode hop map is generated which is used to adjust the laser write power (input power) during normal write operations.

FIGS. 2A and 2B show a data storage device in the form of a disk drive according to an embodiment comprising a head 16 actuated over a recording medium in the form of a disk surface 18, wherein the head 16 comprises a laser 20 configured to heat the disk surface. The disk drive further comprises control circuitry 22 configured to execute the flow diagram of FIG. 2C, wherein a mode hop map is generated for a write power applied to the laser during a write operation (block 24). During the write operation (block 26), the laser write power is adjusted in response to the mode hop map (block 28), thereby compensating for laser mode hops.

In the embodiment of FIG. 2B, the head 16 comprises a suitable write element 30 (e.g., an inductive coil), a suitable read element 32 (e.g., a magnetoresistive element), and a suitable fly height actuator (FHA) 34 configured to actuate the head 16 vertically over the disk 18. Any suitable FHA 34 may be employed, such as a heater that actuates through thermal expansion, or a piezoelectric actuator that actuates through mechanical deflection. The head 16 may also comprise other suitable optical components associated with the laser 20, such as a near field transducer configured to focus the laser onto the disk surface 18.

Figure 3A:
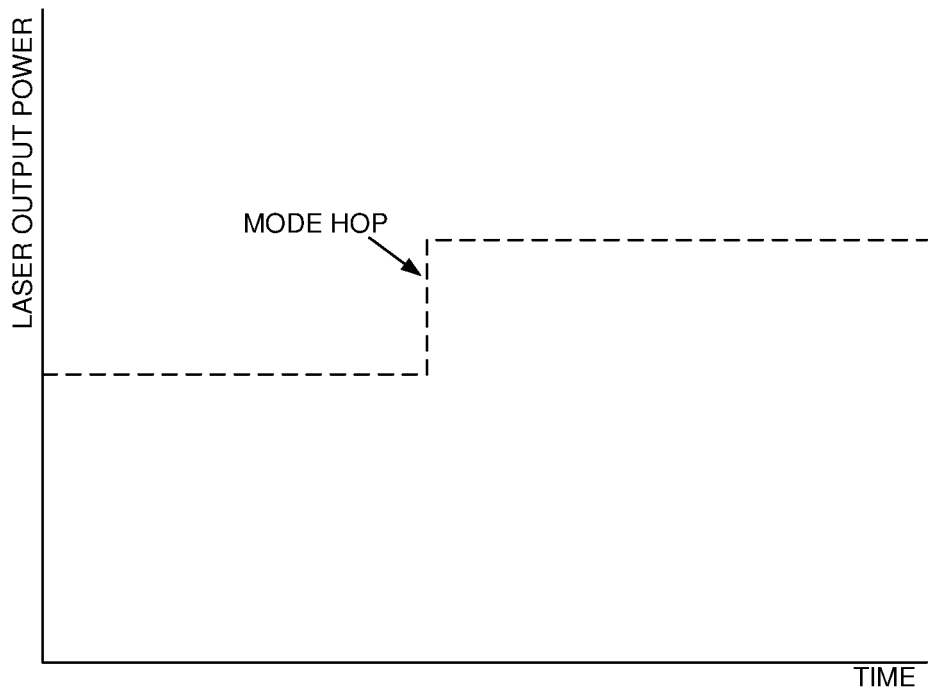
FIG. 3A shows an example mode hop in the output power of the laser due to self heating during a write operation.
Figure 3B:
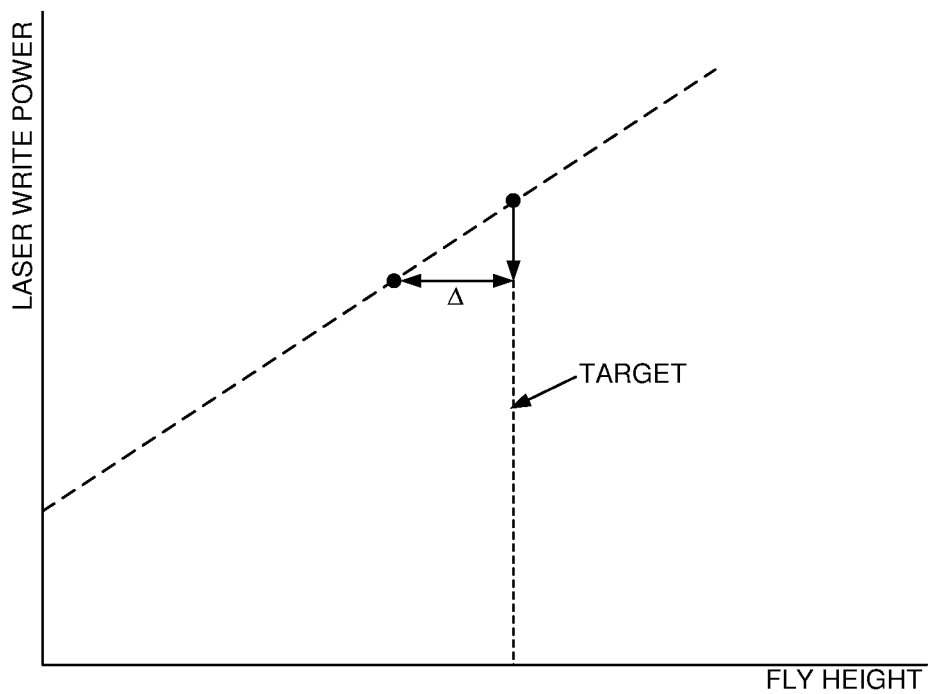
FIG. 3B shows an embodiment wherein a mode hop in the output power of the laser is compensated by adjusting the laser write power during a write operation based on a pre-calibrated mode hop map.

FIG. 3A shows a representation of an example mode hop in the output power of the laser 20 during a write operation which is typically caused by a self heating of the laser 20 during the write operation. The example of FIG. 3A shows the mode hop as a step perturbation in the output power of the laser; however, the actual perturbation in the output power may manifest as different transitions, such as a linear or polynomial transition. In addition, the mode hop may manifest as a decrease in the output power of the laser rather than an increase as shown in FIG. 3A. In one embodiment, the delta in the output power of the laser may be compensated by making an adjustment to the laser write power and a corresponding adjustment to the FHA power. In the example of FIG. 3B, the laser write power may be decreased in order to compensate for the mode hop increase in the output power of the laser shown in FIG. 3A. Since decreasing the laser write power leads to a corresponding decrease in the fly height of the head due to a decrease in the thermal expansion, in one embodiment the FHA power is also increased in order to maintain the head at the target fly height shown in FIG. 3B. In one embodiment, the FHA power may be adjusted based on a calibrated relationship between the laser write power and the FHA power to achieve a target fly height. In another embodiment, the FHA power may be adjusted and the fly height of the head measured in a closed loop system until the target fly height is achieved. In one embodiment, the adjustment to the laser write power and corresponding adjustment to the FHA power is saved in an entry of a mode hop map which is then used in subsequent write operations to compensate for the mode hop.

Figure 4A:
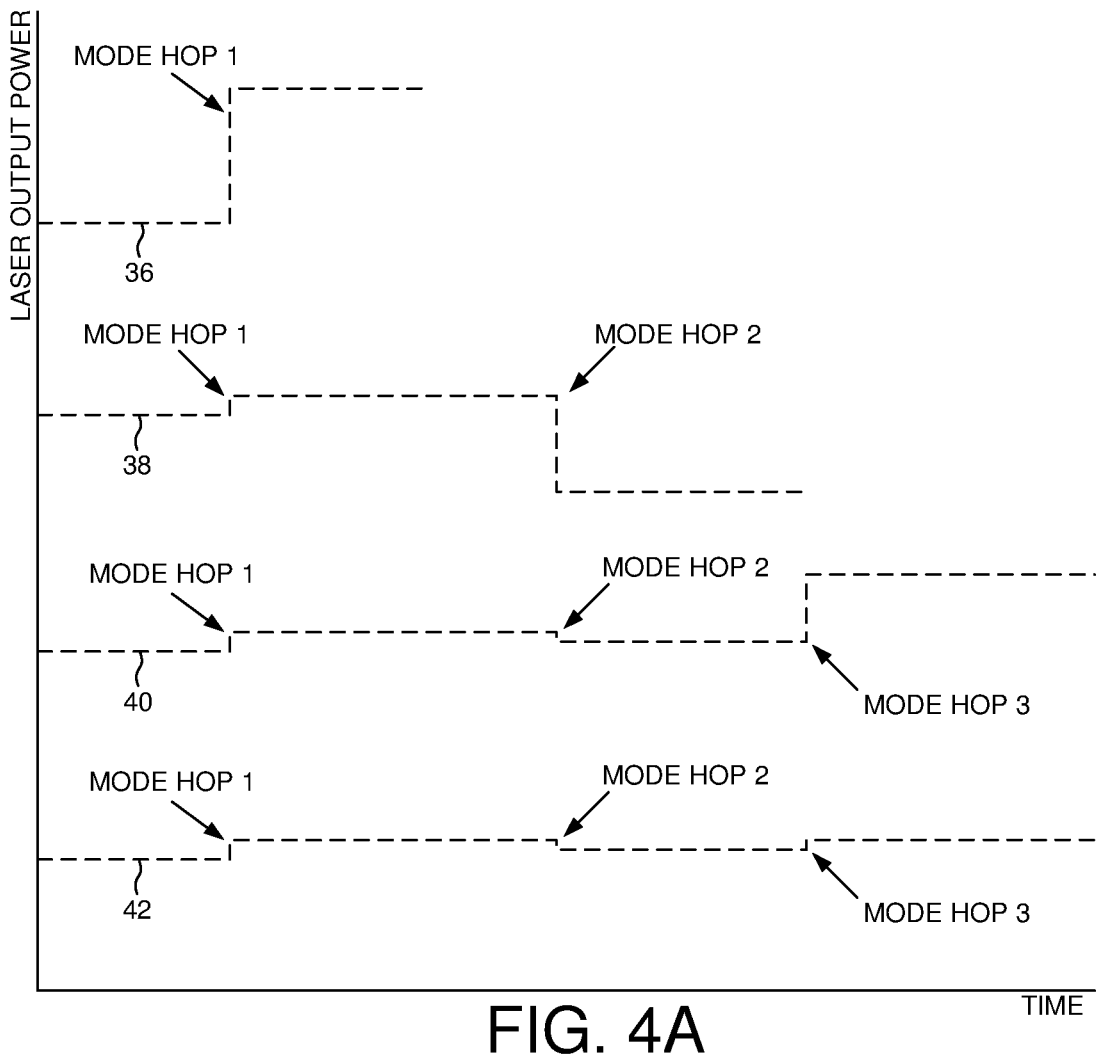
FIG. 4A shows an embodiment wherein multiple mode hops are detected and compensated in order to generate a mode hop map.
Figure 4B:
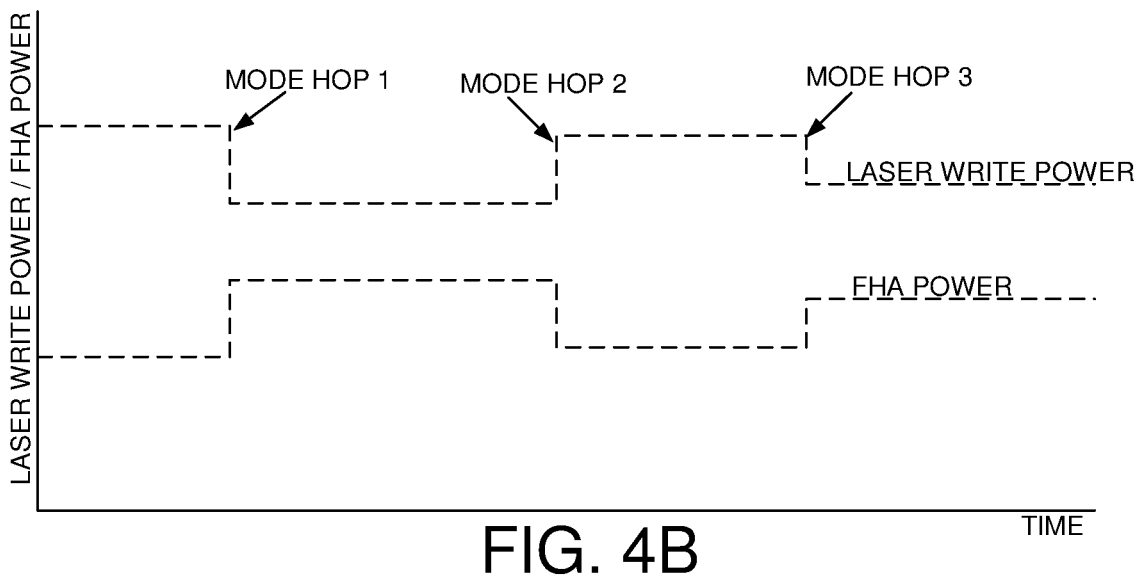
FIG. 4B shows an embodiment wherein a detected mode hop is compensated by adjusting the laser write power to compensate for the perturbation in the laser output power, and making a corresponding adjustment to the FHA power.

FIG. 4A shows an embodiment wherein a mode hop map is generated in a serial process by detecting and compensating for each mode hop of the laser over a long write operation. During a first test write 36, test data is written to the disk surface and a first mode hop in the output power of the laser is detected (an increase the laser output power in this example). In one embodiment, the mode hop may be detected during the first test write, for example, using a photodiode integrated into the head. In another embodiment, the mode hop may be detected by reading the test data to generate a read signal, and processing the read signal to detect the mode hop. For example, a written-in amplitude (e.g., average amplitude) of the read signal may indicate when a mode hop occurs since in one embodiment the written-in amplitude of the read signal varies proportionally with the output power of the laser. FIG. 4B shows an embodiment wherein the first mode hop is compensated by adjusting the laser write power with a corresponding adjustment to the FHA power. In one embodiment, the laser write power and FHA power may be adjusted incrementally and the test write re-executed in order to measure the efficacy of the mode hop compensation. That is a second test write 38 in FIG. 4A is executed, wherein when the first mode hop is reached (in time), the laser write power is adjusted based on the first entry in the mode hop map. The output power of the laser is then evaluated (e.g., using a photodiode or by reading the test data) in order to measure the efficacy of the mode hop compensation. If the compensation of the mode hop is insufficient, the laser power and the FHA power are incrementally adjusted and the test write re-executed. This processed is repeated in a closed loop until the first mode hop is sufficiently compensated during the second write 38 such as shown in FIG. 4A. During the last iteration of the second test write 38, the next mode hop of the laser may be detected (the second mode hop) after having compensated for the first mode hop. A third test write 40 is then executed iteratively while adjusting the laser write power and FHA power until the second mode hop is sufficiently compensated. This process is then repeated during a fourth test write 42 in order to compensate for the next mode hop (the third mode hop) and so on until an entry has been generated in the mode hop map that compensates for each of the laser mode hops. FIG. 4B shows an example mode hop map for the laser write power and FHA power that compensates for the mode hops detected in FIG. 4A. Having generated the mode hop map by executing the test writes, the mode hop map may then be used to compensate for the laser mode hops during normal write operations.

Figure 5A:
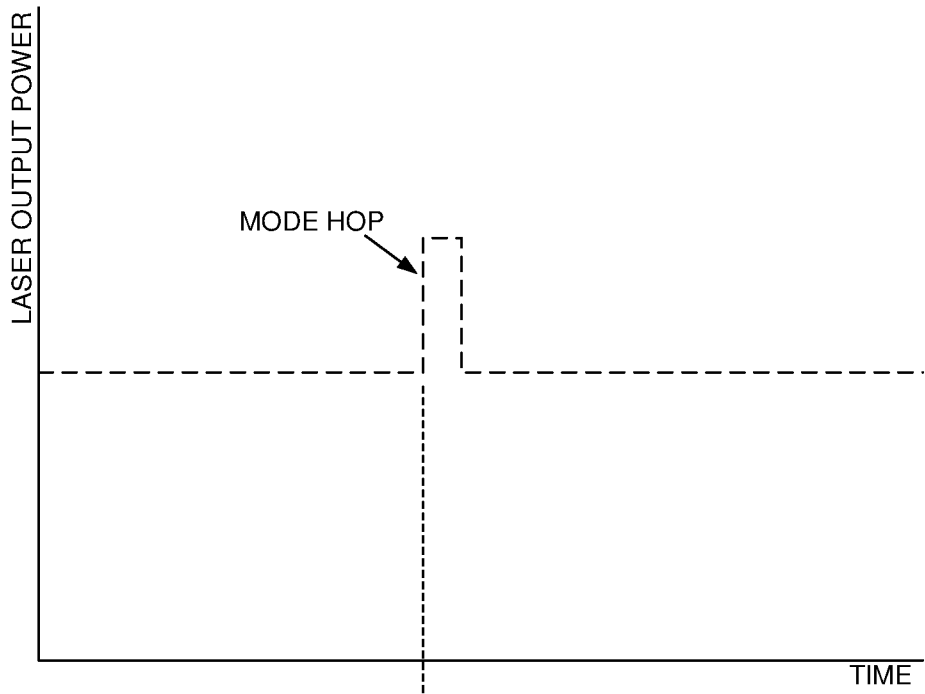
FIGS. 5A and 5B show an embodiment wherein a detected mode hop is compensated by adjusting the laser write power with a fat pulse that avoids the mode hop during normal write operations.
Figure 5B:
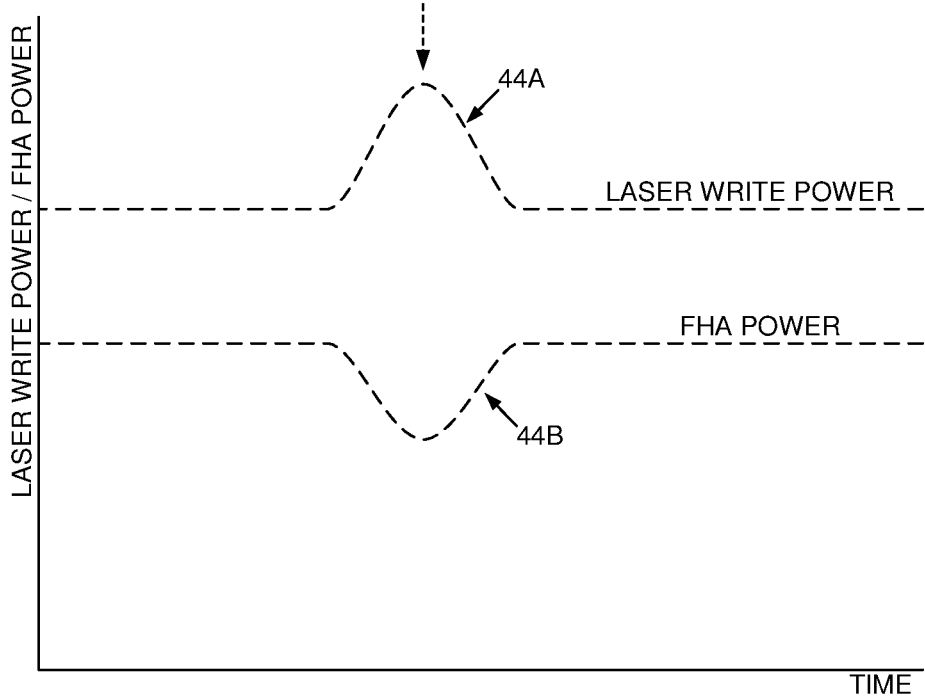

In the embodiment of FIGS. 4A and 4B, the perturbation in the laser output power due to a first mode hop may be substantially static until reaching the next mode hop which is why the resulting transition in the laser output power may be compensated by adjusting the laser write power (and FHA power). In another embodiment, the perturbation in the output power of the laser due to a mode hop may be a transient effect caused by a particular combination of write power applied to the laser and temperature of the laser. Accordingly in one embodiment a mode hop may be avoided by gradually adjusting the laser write power and FHA power through the interval of the mode hop, thereby avoiding the combination of laser write power and temperature that causes the mode hop. FIGS. 5A and 5B show an example of this embodiment wherein after detecting a transient mode hop that occurs during a test write, the laser write power and the FHA power are adjusted using a "fat pulse" 44A and 44B so as to gradually adjust the laser write power and FHA power through the interval of the detected mode hop.

Figure 6A:
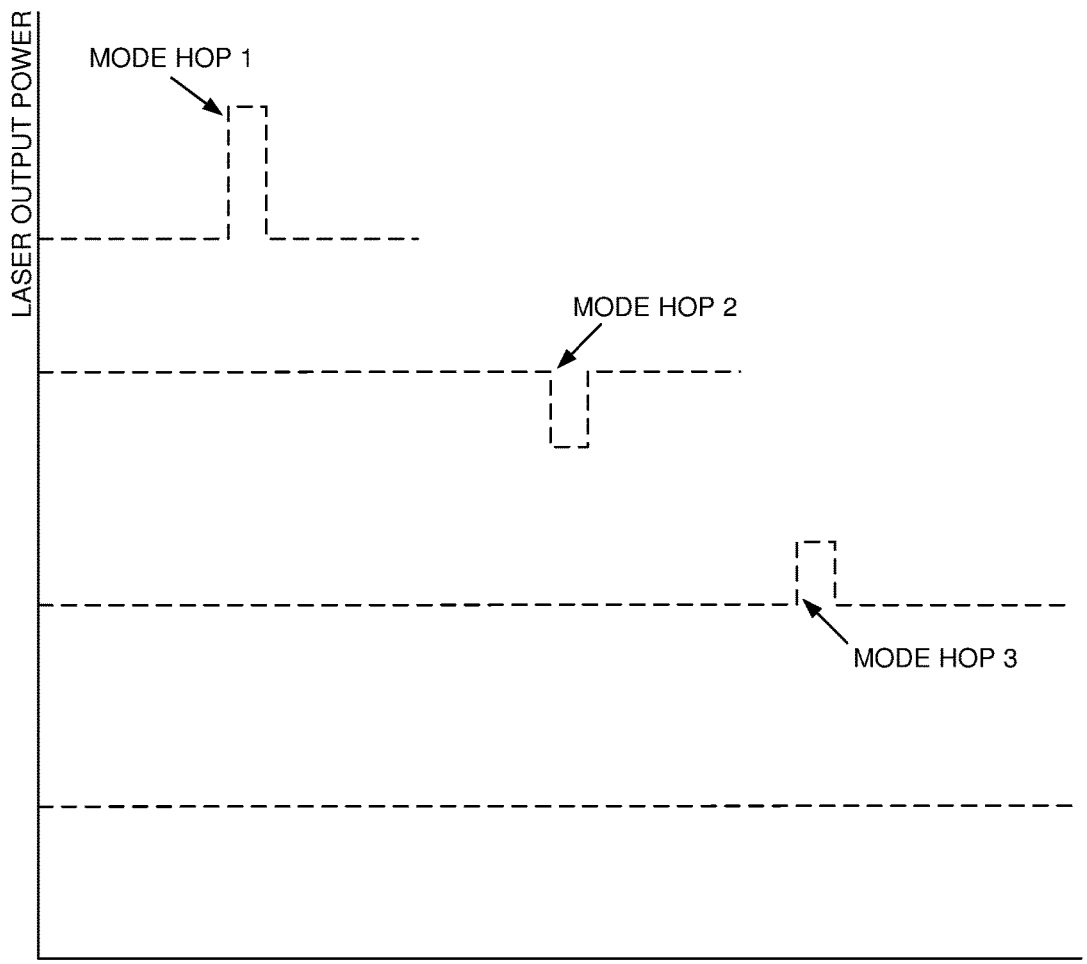
FIGS. 6A and 6B show an embodiment wherein multiple mode hops are compensated by adjusting the laser write power with a fat pulse during normal write operations.
Figure 6B:
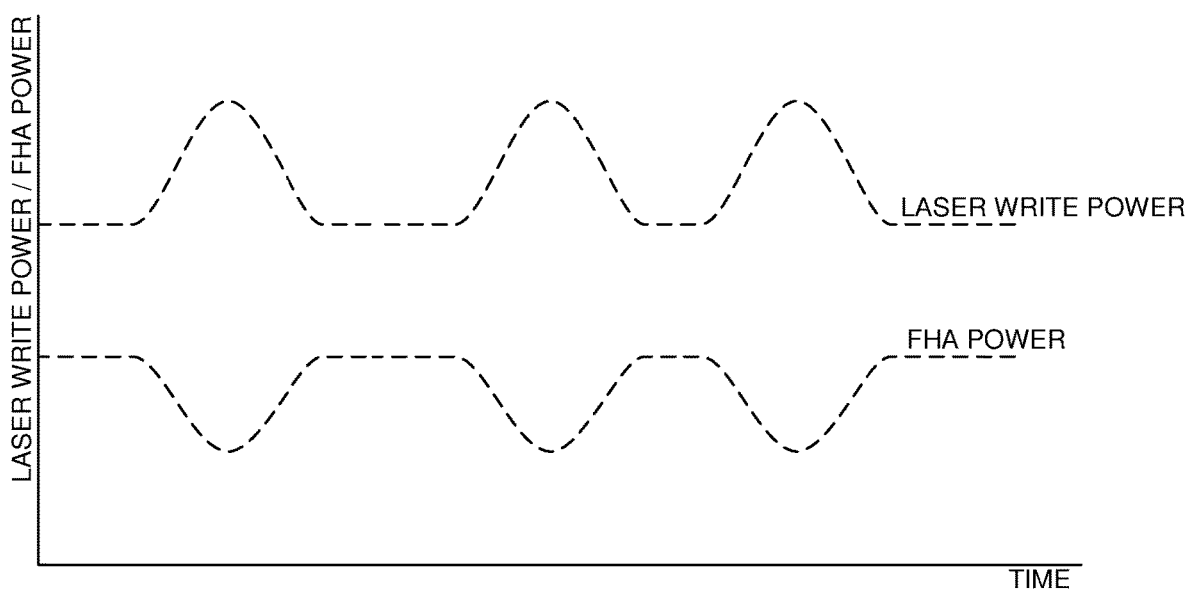

FIGS. 6A and 6B show an embodiment wherein multiple transient mode hops may be detected and compensated using a fat pulse adjustment to the laser write power and FHA power. In one embodiment, the test writes shown in FIG. 6A are executed serially in order to detect a new mode hop while compensating for previous mode hops. In this manner, any time shift of a mode hop due to compensating for previous mod hops is accounted for. In one embodiment, the shape of the fat pulses may be optimized, such as adjusting the width and/or amplitude of the pulses, until the corresponding mode hop no longer occurs during the test write. In the embodiment shown in FIG. 6B, the fat pulses for adjusting the laser write power in the mode hop map are positive pulses; however, in another embodiment the fat pulses may be negative pulses (with corresponding positive pulses to adjust the FHA power).

Figure 7:
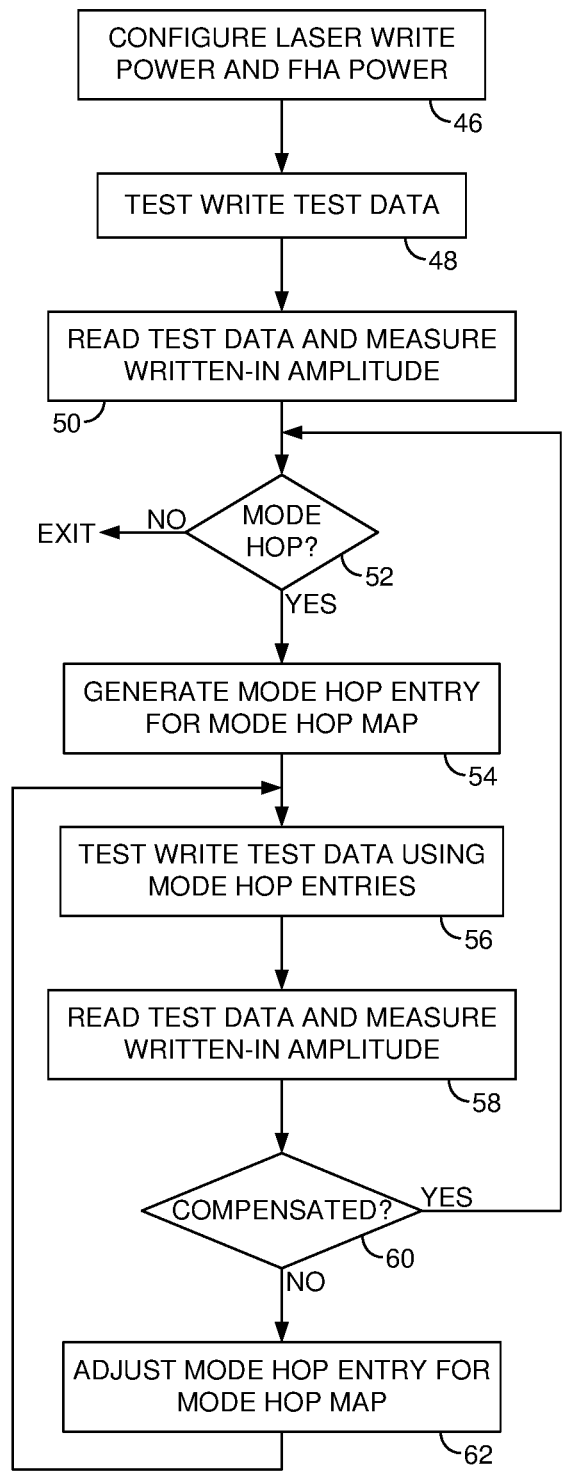
FIG. 7 is a flow diagram according to an embodiment wherein the mode hops are detected and compensated in a serial process when generating the mode hop map.

FIG. 7 is a flow diagram according to an embodiment for generating a mode hop map by detecting and compensating for each mode hop in a serial process. The laser write power and FHA power are configured into initial values (block 46), such as selecting the lowest laser write power and corresponding highest FHA power that achieves a target fly height that yields a target written-in amplitude of the read signal. A test write is executed to write test data over a predetermined interval (block 48). The test data is then read and the written-in amplitude of the read signal evaluated to determine whether a mode hop occurred during the test write (block 50). When a mode hop is detected (block 52), an entry is generated for the mode hop map (block 54), such as an adjustment to the laser write power and FHA power as shown in FIG. 4B, or a fat pulse adjustment such as shown in FIG. 6B. Another test write is then executed to re-write the test data over the predetermined interval while adjusting the laser write power and FHA power based on the entries in the mode hop map (block 56). The test data is then read and the written-in amplitude of the read signal evaluated to determined whether the detected mode hop has been compensated (block 58). If the detected mode hop is not sufficiently compensated (block 60), the corresponding entry in the mode hop map is adjusted (block 62), such as by adjusting the amplitude of the laser write power and FHA power, or adjusting the width and/or amplitude of the fat pulses. The flow diagram is then repeated from block 56 until the detected mode hop has been sufficiently compensated at block 60. Referring again to FIG. 4A, in one embodiment the amplitude of the laser write power and FHA power are adjusted until the first mode hop has been compensated during test write 38. During the test write 38, the test data is written for an interval that extends into a second mode hop, and so after compensating for the first mode hop at block 60 of FIG. 7, a second mode hop may be detected at block 52. The second mode hop is then compensated by executing the flow diagram from block 54 similar to compensating for the first mode hop. The flow diagram of FIG. 7 is repeated until all of the mode hops have been detected and compensated in a serial order.

In one embodiment, the operating temperature of the data storage device may affect the temperature of the laser during write operations, and therefore may affect when a mode hop might occur during the interval of a write operation. In addition, the amplitude of the laser write power during write operations may affect when a mode hop might occur during the interval of a write operation. Accordingly in one embodiment shown in FIG. 8, a mode hop map may be generated for a number of different operating temperatures and for a number of different laser write powers. During normal operation, the control circuitry may measure the operating temperature and then select the corresponding mode hop map from the table of FIG. 8 that is closest to the current operating temperature and laser write power.

In one embodiment, the mode hop maps shown in FIG. 8 may be periodically recalibrated while the data storage device is deployed in the field in order to account for changes in the mode hops that can occur over time. For example, general degradation of the laser occurring over time may cause the mode hops to shift in time and/or may cause additional mode hops to manifest. In one embodiment, the control circuitry may periodically execute a number of test writes as described above in order to verify the efficacy of the mode hop maps. When the test writes indicate the efficacy of the mode hop maps is degrading, the control circuitry may re-execute the test writes as described above in order to recalibrate the mode hop maps.

In one embodiment, it may be desirable to determine the actual temperature of the laser (as compared to the self-heating temperature) when a mode hop occurs over a range of different laser write powers. For example, information about the actual temperature of the laser when a mode hop occurs may provide useful feedback to the laser manufacturer in order to improve the fabrication process. In another embodiment, detecting the actual temperature of the laser when a mode hop occurs may help generate the first entry of the mode hop map so as to compensate for a mode hop that may occur at the beginning of a write operation. That is, it may be difficult to detect a mod hop based on test writing test data as described above if the mod hop occurs near the beginning of a write operation. Accordingly in one embodiment, a special type of test write referred to as a "burst write" is used to detect a mode hop in the output power of the laser before the laser begins self heating.

An example of this embodiment is shown in FIG. 9A wherein a burst write of a burst pattern is executed at a given laser write power (and corresponding FHA power) and at a given temperature, and the laser output power is measured (e.g., using a photodiode or by reading the burst pattern and measuring the written-in amplitude of the read signal). This process is repeated for a number of different operating temperatures in order to detect a mode hop in the laser output power such as shown in FIG. 9A. In one embodiment, burst writing the burst pattern prevents the laser from self heating, and so the operating temperature of the data storage device is effectively the temperature of the laser when the mode hop is detected. An example embodiment of burst writing a burst pattern in order to evaluate the laser without self heating is disclosed in U.S. Pat. No. 9,881,641 entitled "BUST WRITING FOR CLEARANCE CALIBRATION IN A HEAT ASSISTED MAGNETIC RECORDING SYSTEM," the disclosure of which is incorporated herein by reference. In one embodiment shown in FIG. 9B, a table is generated with a number of rows each corresponding to a different laser write power and a number of columns each corresponding to a different operating temperature of the data storage device. The laser output power is measured and saved for each entry in the table, and then used to detect a mode hop of the laser by detecting a perturbation in the laser output power (e.g., a deviation from an expected linear relationship in the laser output power versus temperature or laser write power).

Figure 10:
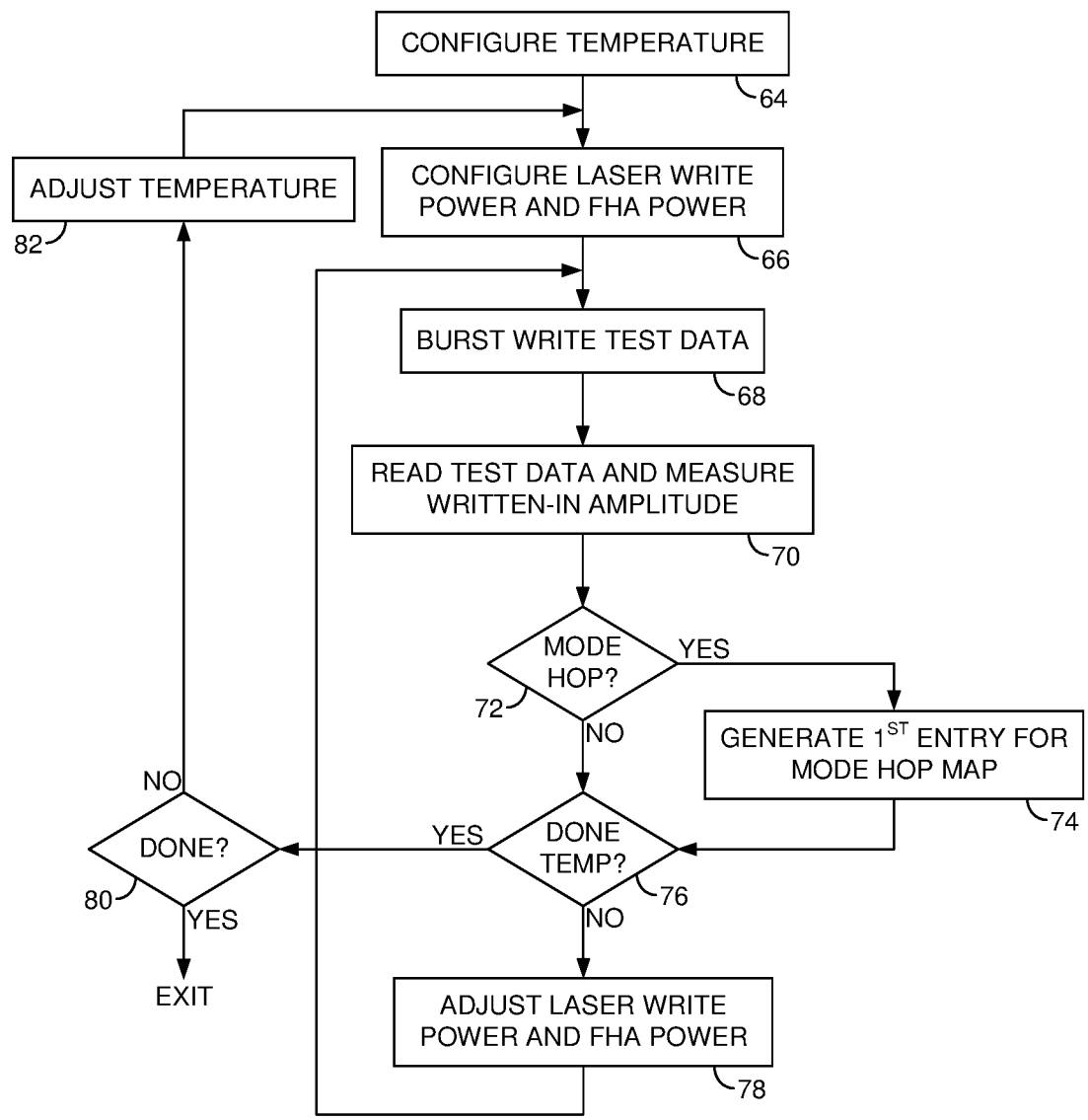
FIG. 10 is a flow diagram according to an embodiment wherein the first entry of a mode hop map may be generated when a mode hop is detected at the current laser write power and the current operating temperature of the data storage device.

FIG. 10 is a flow diagram according to an embodiment for generating the first entry of a mode hop map when a mode hop occurs near the beginning of a write operation. The operating temperature of the data storage device is configured to an initial value (block 64), and the laser write power and FHA power are configured to initial values (block 66). In one embodiment, the initial operating temperature may correspond to a low temperature shown in FIG. 9A, and the initial laser write power and FHA power may correspond to an entry in the table shown in FIG. 8. A burst write is executed to write a burst pattern to the disk surface (block 68), and the burst pattern is read from the disk surface to measure the written-in amplitude of the read signal (block 70). When the written-in amplitude of the read signal indicates a mode hop has occurred at the current operating temperature (block 72) such as the mode hop shown in FIG. 9A, the first entry in the corresponding mode hop map (e.g., in FIG. 8) is generated to compensate for the mode hop. If a mode hop is not detected at block 72, the laser write power and FHA power are adjusted (block 78), for example, to a different entry in the table of FIG. 8. The flow diagram is then repeated from block 68 in order to detect whether a mode hop occurs at a different laser write power for the current operating temperature, and when a mode hop is detected, the first entry in the corresponding mode hop map is generated at block 74. This process continues until all of the laser write powers have been tested for the current operating temperature at block 76, at which time the operating temperature is adjusted (e.g., increased) at block 82 and the flow diagram repeated from block 66. The overall process is repeated until all of the operating temperatures (e.g., in the table of FIG. 8) have been tested and the first entry in the corresponding mode hop maps generated to compensate for a mode hop that may occur at the beginning of a write operation.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

It is to be understood that the embodiments discussed herein are applicable to a data storage device such as a hard disk drive (HDD) as well as a tape drive such as a tape embedded drive (TED) or an insertable tape media drive. An example TED is described in co-pending application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a recording medium;
   a head actuated over the recording medium, wherein the head comprises a laser configured to heat the recording medium; and
   control circuitry configured to:
   generate a mode hop map for a write power applied to the laser for a write operation by:
   applying the write power to the laser during a first test write;
   detecting a first mode hop of the laser during the first test write;
   generating a first compensation for the detected first mode hop;
   applying the write power to the laser during a second test write;
   adjusting the write power using the first compensation to compensate for the first mode hop during the second test write; and
   after compensating for the first mode hop, detecting a second mode hop of the laser during the second test write; and
   generating a second compensation for the detected second mode hop; and
   apply the write power to the laser during the write operation and adjust the write power in response to the mode hop map.

2. The data storage device as recited in claim 1, wherein the control circuitry is further configured to generate the first compensation by:
   detecting a perturbation in an output power of the laser corresponding to the first mode hop; and
   generating a power adjustment to the write power corresponding to an amplitude of the perturbation.

3. The data storage device as recited in claim 2, wherein the control circuitry is further configured to detect the perturbation of the output power of the laser by:
   reading test data from the recording medium written during the first test write to generate a read signal; and
   detecting the perturbation of the output power of the laser based on the read signal.

4. The data storage device as recited in claim 3, wherein the control circuitry is further configured to detect the perturbation of the output power of the laser by detecting a written-in amplitude of the read signal.

5. The data storage device as recited in claim 1, wherein the first compensation comprises a power adjustment that prevents the first mode hop from occurring.

6. The data storage device as recited in claim 5, wherein the power adjustment comprises a fat pulse power adjustment.

7. The data storage device as recited in claim 1, wherein the control circuitry is further configured to apply the write power to the laser during the write operation and adjust the write power in response to the first compensation to compensate for the first mode hop and adjust the write power in response to the second compensation to compensate for the second mode hop.

8. The data storage device as recited in claim 1, wherein the control circuitry is further configured to:
generate a plurality of mode hop maps each corresponding to a different operating temperature of the data storage device;
measure an operating temperature of the data storage device;
select the mode hop map corresponding to the measured operating temperature; and
apply the write power to the laser during the write operation and adjust the write power in response to the selected mode hop map.

9. A data storage device comprising:
a recording medium;
a head actuated over the recording medium, wherein the head comprises a laser configured to heat the recording medium; and
control circuitry configured to:
apply a write power to the laser during a first test write;
detect a first mode hop of the laser during the first test write;
generate a first compensation for the detected first mode hop by:
applying the write power to the laser during a second test write;
adjusting the write power using the first compensation to compensate for the first mode hop during the second test write;
measuring an efficacy of the first compensation to compensate for the first mode hop; and
adjusting the first compensation based on the measured efficacy; and
apply the write power to the laser during a write operation and adjust the write power in response to the first compensation to compensate for the first mode hop.

10. The data storage device as recited in claim 9, wherein the control circuitry is further configured to generate the first compensation by:
detecting a perturbation in an output power of the laser corresponding to the first mode hop; and
generating a power adjustment to the write power corresponding to an amplitude of the perturbation.

11. The data storage device as recited in claim 9, wherein the first compensation comprises a power adjustment that prevents the first mode hop from occurring.

12. The data storage device as recited in claim 9, wherein the adjustment to the write power comprises a fat pulse adjustment.

13. The data storage device as recited in claim 12, wherein the control circuitry is further configured to generate the first compensation by adjusting the fat pulse based on the measured efficacy.

14. The data storage device as recited in claim 9, wherein the control circuitry is further configured to:
after compensating for the first mode hop, detect a second mode hop of the laser during the second test write;
generate a second compensation for the detected second mode hop; and
apply the write power to the laser during the write operation and adjust the write power in response to the first compensation to compensate for the first mode hop and adjust the write power in response to the second compensation to compensate for the second mode hop.

15. The data storage device as recited in claim 9, wherein the control circuitry is further configured to:
generate a plurality of compensations for the detected first mode hop, wherein each compensation corresponds to a different operating temperature of the data storage device;
measure the operating temperature of the data storage device;
select the compensation corresponding to the measured operating temperature; and
apply the write power to the laser during the write operation and adjust the write power in response to the selected compensation.

16. A data storage device comprising:
a recording medium;
a head actuated over the recording medium, wherein the head comprises a laser configured to heat the recording medium; and
control circuitry configured to:
apply a write power to the laser while burst writing first test data to the recording medium at a first temperature;
read the first test data from the recording medium to generate a first read signal;
measure a first written-in amplitude of the first read signal;
apply the write power to the laser while burst writing second test data to the recording medium at a second temperature;
read the second test data from the recording medium to generate a second read signal;
measure a second written-in amplitude of the second read signal; and
detect a mode hop of the laser based on the first and second written-in amplitude measurements.

17. The data storage device as recited in claim 16, wherein the control circuitry is further configured to:
adjust the write power for the laser based on the detected mode hop; and
write user data to the recording medium while applying the adjusted write power to the laser.

18. A data storage device comprising:
a recording medium;
a head actuated over the recording medium, wherein the head comprises a laser configured to heat the recording medium; and
control circuitry configured to:
apply a write power to the laser during a first test write;
detect a first mode hop of the laser during the first test write;
generate a plurality of compensations for the detected first mode hop, wherein each compensation corresponds to a different operating temperature of the data storage device;
measure the operating temperature of the data storage device;
select the compensation corresponding to the measured operating temperature; and
apply the write power to the laser during the write operation and adjust the write power in response to the selected compensation, wherein the operating temperature of the data storage device causes a change in the mode hop of the laser.

* * * * *